US005200151A

United States Patent [19]

Long

[11] Patent Number: 5,200,151

[45] Date of Patent: Apr. 6, 1993

[54] FLUID DISPENSING SYSTEM HAVING A PIPETTE ASSEMBLY WITH PRESET TIP LOCATOR

[75] Inventor: Ernest W. Long, Concord, Mass.

[73] Assignee: P B Diagnostic Systems, Inc., Westwood, Mass.

[21] Appl. No.: 526,310

[22] Filed: May 21, 1990

[51] Int. Cl.[5] .......................... G01N 21/00; B01L 3/02

[52] U.S. Cl. ........................................ 422/100; 422/64; 422/63; 73/864.21; 73/864.01

[58] Field of Search ........................ 422/63, 64, 65, 99, 422/100; 73/863.32, 864.01-864.25; 53/314, 334

[56] References Cited

U.S. PATENT DOCUMENTS

| | | | |
|---|---|---|---|
| 4,072,330 | 2/1978 | Brysch | 73/864.14 |
| 4,215,092 | 7/1980 | Suovaniemi et al. | 422/100 |
| 4,284,604 | 8/1981 | Tervamaki et al. | 422/100 |
| 4,347,750 | 9/1982 | Tersteeg et al. | 73/864.31 |
| 4,347,875 | 9/1982 | Columbus, et al. | 141/18 |
| 4,474,071 | 10/1984 | d/Autry | 73/864.13 |
| 4,478,094 | 10/1984 | Salomaa et al. | 73/863.32 |
| 4,586,546 | 5/1986 | Mezei et al. | 141/2 |
| 4,671,123 | 6/1987 | Magnussen et al. | 73/864.16 |
| 4,748,859 | 6/1988 | Magnussen, Jr. et al. | 73/864.01 |
| 4,824,641 | 4/1989 | Williams | 422/100 |
| 4,961,350 | 11/1990 | Tennstedt | 73/864.01 |

FOREIGN PATENT DOCUMENTS

| | | |
|---|---|---|
| 0148333 | 7/1985 | European Pat. Off. . |
| 0337726 | 10/1989 | European Pat. Off. . |

*Primary Examiner*—Robert J. Warden
*Assistant Examiner*—Theresa A. Trembley
*Attorney, Agent, or Firm*—Gaetano D. Maccarone

[57] ABSTRACT

There is described a fluid dispensing system which includes a pipette assembly adapted for use with disposable pipette tips. To ensure a precise location of a disposable pipette tip on the distal end of the stem of the pipette assembly which holds the pipette tip, a proximal chamber of the pipette tip envelops the distal end of the stem and includes a ledge which encircles an annular region of the stem to form an abutment for the stem and establish a precise distance between the distal end of the stem and the pipette tip orifice. In a preferred embodiment the fluid dispensing system is incorporated in an automated analytical instrument.

12 Claims, 5 Drawing Sheets

FLUID DISPENSING SYSTEM HAVING A PIPETTE ASSEMBLY WITH PRESET TIP LOCATOR

BACKGROUND OF THE INVENTION

The application is directed to a fluid dispensing system and in particular to one which includes a pipette assembly adapted for use with disposable pipette tips.

Various types of chemical tests can be performed by automated test equipment, an example of testing of considerable interest being the assay of biological substances for human health care. Automated test equipment allows large numbers of test samples to be processed rapidly. Such equipment is employed in health care institutions including hospitals and laboratories. Biological fluids, such as whole blood, plasma or serum are tested to find evidence of disease, to monitor therapeutic drug levels, etc.

In the automated test instrument a sample of the test fluid is typically provided in a sample cup and all of the process steps including pipetting of the sample onto an assay test element, incubation and readout of the signal obtained are carried out automatically. All the process steps can be carried out while the assay test element is carried by a conveyor within a temperature controlled chamber. Further, in such instruments disposable pipette tips are typically used for the delivery of one fluid only and then discarded so as to avoid contamination which could lead to errors in the assay result.

It is necessary in many instances, when dispensing the sample fluid and/or test reagent(s) to the assay element, that the orifice of the pipette tip be located at a predetermined, precisely controlled location above the assay element to prevent spilling or splashing of the fluid and to ensure the transfer of a precise amount of fluid. This requirement can be better understood from the following discussion of the typical manner in which a fluid dispensing system operates in a typical automated analytical instrument. The fluid dispensing system which includes a pipette is used to transfer sample fluid and/or test reagents from storage cups or wells within the instrument to the assay test element. The pipette includes a hollow tube or stem typically of metal, which is adapted to cooperate with a disposable pipette tip, which is typically made of a polymeric material. The disposable pipette tips are provided in a storage tray within the instrument. Initially, the pipette is advanced downwardly to secure a disposable tip by frictional contact. Thereafter, a predetermined amount of fluid is aspirated into the pipette tip and the tip is then moved automatically to a dispense position above an assay test element where a predetermined volume of the fluid is dispensed to the assay element. Upon completion of the dispense step the tip is discarded and a clean disposable tip is used for the next dispense step.

A problem can arise in the use of such a fluid dispense system due to the fact that each disposable tip is positioned on the metal stem of the pipette by a frictional fit. Since the polymeric materials from which disposable tips are typically made are flexible, there may be some variation from tip to tip as to the distance of the tip orifice from the metal stem of the pipette. Since, as mentioned previously, it may be necessary to locate the pipette tip orifice at a predetermined, precisely controlled position above the assay element during the dispense steps, any variation in the positioning of the disposable tip on the pipette stem can result in an error in the desired positioning of the pipette tip which can lead to an error in the assay result.

Accordingly, it would be desirable to provide, in an analytical instrument which utilizes disposable tips in conjunction with a pipette for delivering fluids to an assay test element, the capability of accurately establishing the relative positions of the tip orifice and the holder on which the tip is carried.

SUMMARY OF THE INVENTION

These and other objects and advantages are provided in accordance with the invention by providing a fluid dispensing system which includes a pipette assembly and a disposable pipette tip. It is an object of the invention to provide a system wherein disposable pipette tips can be repetitively removed and replaced whereby the orifice of each tip attached to the pipette assembly is located at substantially the same distance from the stem of the pipette assembly on which the tip is carried. Where the pipette assembly is incorporated in an automated analytical instrument, the pipette can be positioned accurately in the dispense position by a microprocessor controlled transport assembly, the latter having a vertical drive for raising and lowering the pipette assembly. After the fluid is dispensed to the assay element, the pipette assembly is prepared for reuse by removal of the used tip and replacing it with a new one. The used tip can be removed by moving the pipette into a tip extractor which envelops a lip formed around the upper end of the tip and raising the pipette assembly to cause the pipette tip to be removed and caught by a collection receptable. A replacement tip is provided on the pipette stem by positioning the pipette assembly above a new tip located on a pipette tip holder and lowering the pipette assembly such that the stem engages a proximal end of the tip.

In accordance with the invention the fluid dispense system comprises a pipette assembly having a pipette tip holder which includes a crown and a stem extending from the crown, and a disposable pipette tip. The pipette tip has a chamber for receiving the stem of the tip holder. A snap-action device located along an interface between the holder stem and the tip crown retains the holder stem in the tip chamber. The tip stem has a passage extending along a central axis of the tip from a distal port of the tip to communicate with the tip chamber at a distal end of the tip chamber. The tip crown is constructed with a ledge at the distal end of the tip chamber, the ledge being located at a predetermined distance from the distal port of the tip. The ledge encircles a proximal end of the stem passage. The holder stem has a passage extending along a central axis of the holder stem to a distal port of the holder stem to communicate with the tip passage upon insertion of the holder stem into the tip chamber. A surface of the distal part of the holder stem is configured to mate with the ledge so as to position the holder distal part at the predetermined distance from the tip orifice.

In accordance with further features of the invention, the ledge in the pipette tip chamber is advantageously constructed of a resilient material, preferable polymeric, to form a fluid seal with the distal part of the holder. The vertical drive preferably comprises a stepper motor for accurate positioning of the pipette. The vertical drive is connected to the pipette by a spring-loaded lost-motion connection which allows relative motion between the pipette and the vertical drive upon a contacting of the holder with a replacement tip on the tray. Inner and outer rings may also be provided along an interface between the tip cavity and the holder stem to provide a further fluid seal.

BRIEF DESCRIPTION OF THE DRAWING

For a better understanding of the invention as well as other objects and further features thereof, reference is made to the following detailed description of the preferred embodiments taken in conjunction with the accompanying drawings wherein.

DESCRIPTION OF THE PREFERRED EMBODIMENTS

Figure 1:
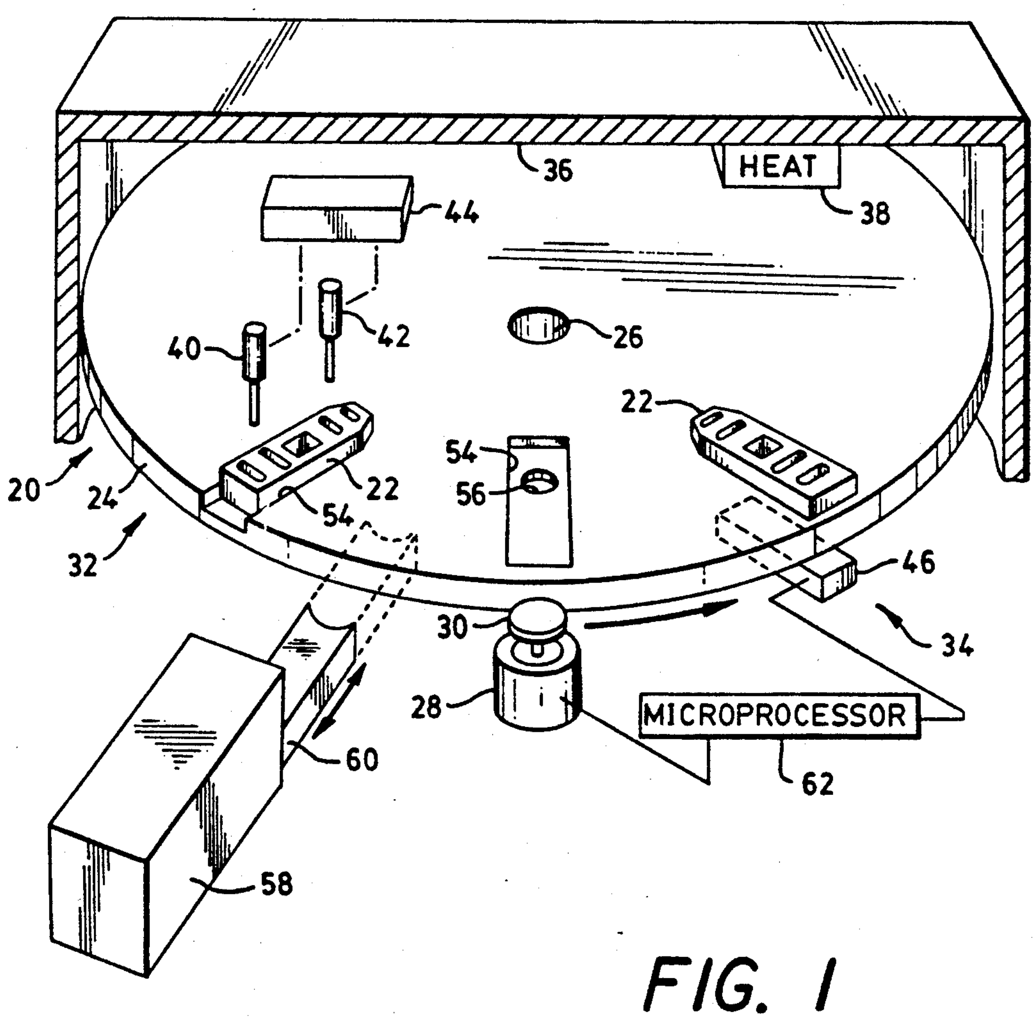
FIG. 1 is a stylized view, partially diagrammatic, of an analytical instrument utilizing assay test modules and a carousel for moving the modules among various work stations.

In FIG. 1, there is shown an analytical instrument 20 which provides automatically a sequence of process steps to accomplish an assay of a test sample. A plurality of assay modules 22 are employed within the instrument 20 to increase the throughput rate, one process step being carried out with one module concurrently with the performance of other process steps with other modules. The modules 22 are illustrated with respect to a preferred embodiment thereof which includes one or more chambers in the housing. Such chambers may be configured as wells, or reservoirs, for the storage and/or mixing of fluids which are used in the assay procedure or the chambers may culminate in an opening to permit fluids to be provided to a reaction zone within the module. The chambers are formed integrally within the housing of the module. The analytical instrument 20 includes a turntable or carousel 24 which is rotated about an axle 26 by a motor 28. By way of example, the motor 28 may be mechanically coupled to the carousel 24 by a gear 30 or by a belt drive (not shown). The carousel 24 carries the modules 22 from one work station to another work station, two such work stations 32 and 34 being shown, by way of example, in FIG. 1. The carousel 24 rotates within a temperature controlled chamber 36 having a heater 38 for maintaining a desired temperature at the various work stations so as to allow for a process step of incubation.

Work station 32 is a pipetting station whereat sample fluid and any other required fluid test reagent(s) are delivered to the assay modules 22. By way of example, there are shown two pipettes 40 and 42. The pipettes, 40 and 42, are positioned and operated by a pipette mechanism 44 mechanically connected to the pipettes 40 and 42, as indicated by dashed lines.

During the assay procedure, as a result of the reaction(s) and interaction(s) between the sample fluid and the test reagent(s) which take place, a detectable change is effected corresponding to the presence of an analyte or component of interest in the sample fluid. The detectable change may be a color change which may be read spectrophotometrically such as with a densitometer or, in an assay method based on fluorescent-labeled biologically active species or one which involves the generation of a fluorescent species as a result of a reaction between test reagents, a fluorescent output signal can be generated and read spectrofluorometrically. Such detectable changes may be read from above or below the assay module. At work station 34 there is shown by way of example a fluorometer 46 for irradiating the reaction zone within the assay module and for measuring the fluorescence emitted from the fluorescent species present therein.

The carousel 24 may be arranged so as to accomodate varying numbers of assay modules 22. Each position, or berth 54 for holding an assay module is provided in this embodiment with a small aperture 56 to allow the irradiating illumination to reach the reaction zone in the assay module and to permit the fluorescent emissions to be collected and measured. Also shown is an injector 58 for inserting a module 22 in an empty berth 54, the injector 58 having an arm 60 for gripping a module 22 during the insertion operation. The injector 58 also serves to extract a module from a berth 54 by use of the arm 60 upon completion of a test procedure. Operation of the motor 28, the pipette mechanism 44, the fluorometer 46 and the injector 58 are synchronized by means of a microprocessor 62.

Figure 2:
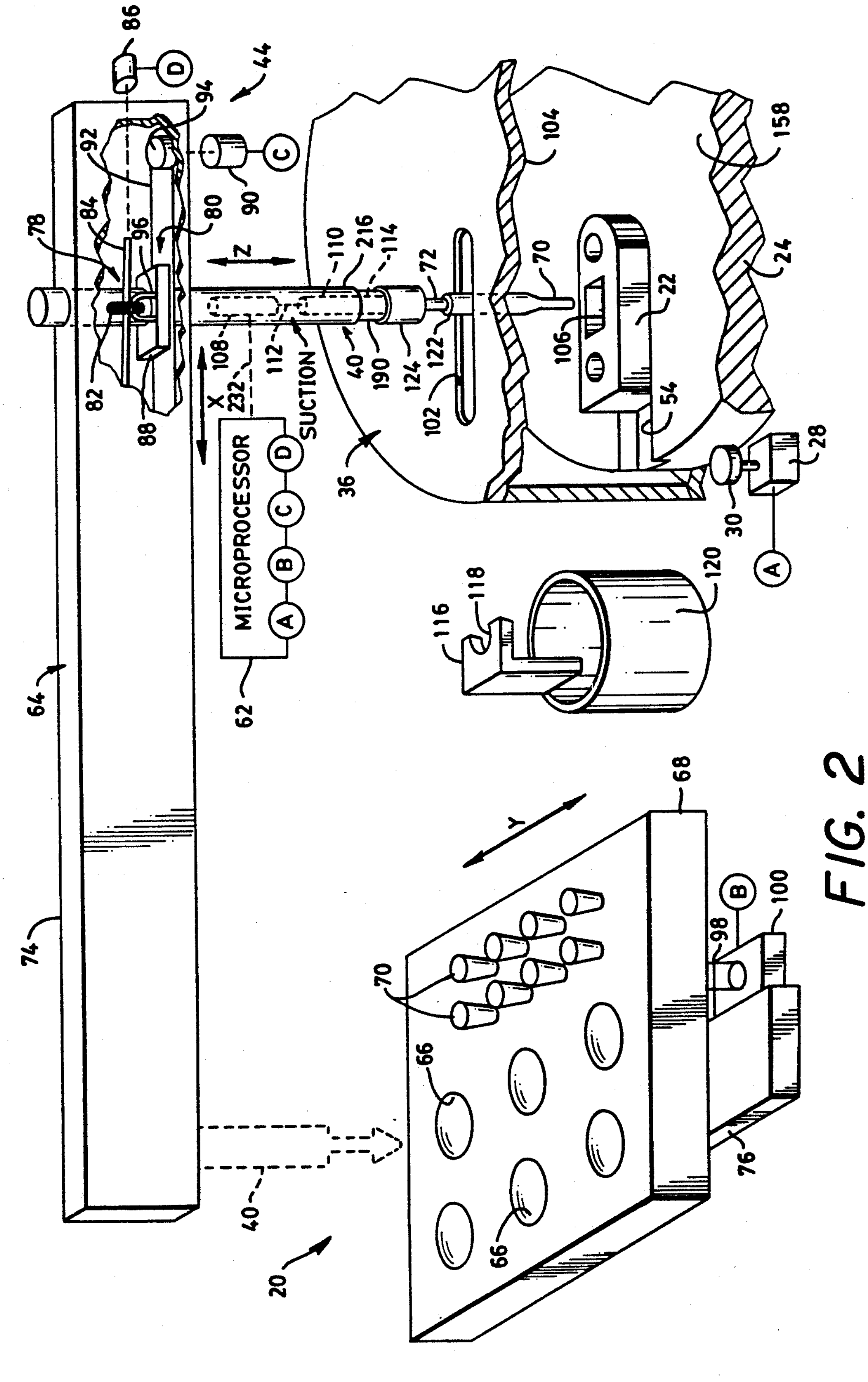
FIG. 2 is a stylized view, partially diagrammatic of a pipette transport for moving the pipette between a supply of pipette tips and reagent reservoirs and compartments of an assay test module.

FIG. 2 provides detail in the construction of the pipette mechanism 44 of FIG. 1. To facilitate description of the invention, the pipette mechanism 44 will be described hereinafter as having a pipette transport 64 operative with only one of the pipettes, namely, the pipette 40. The transport 64 provides for relative movement, in two dimensions, between the pipette 40 and a set of reservoirs 66. The reservoirs 66 are located at a distance from a module 22 on the carousel 24, the reservoirs 66 serving to store reagents useful in carrying out assay tests by the analytical instrument 20. The reservoirs 66 are located on a movable tray or table 68 which also holds a set of tips 70 which are to be affixed to a stem 72 of the pipette 40. With reference to an X-Y-Z coordinate axis system, the pipette 40 is translatable in the X direction along a box beam 74 of the transport 64, and the table 68 is translatable in the Y direction by riding along a rail 76 of the transport 64. A vertical drive 78 is located within the beam 74 and serves to raise and to lower the pipette 40 in the Z direction.

A horizontal drive 80 is located within the box beam 74, and drives the pipette in the X direction. The vertical drive 78 and the horizontal drive 80 are of conventional design, and are indicated in simplified fashion in FIG. 2. Briefly, the vertical drive 78 may be described as comprising a wheel 82 slidably mounted to a spline shaft 84 which, alternatively, may have a square cross section. The shaft 84 is rotated by a motor 86. The horizontal drive 80 includes a base 88 which slides in the X direction along the beam 74 in response to rotation of a motor 90. The motor 90 drives a belt 92 through a pulley 94, the belt 92 being connected to the base 88 for translating the base 88 upon rotation of the pulley 94 by the motor 90. A fixture 96 upstanding from the base 88 slides the wheel 82 along the shaft 84 upon movement of the base 88 so that the wheel 82 stays in fixed position relative to the base 88. The pipette 40 passes through the base 88 so as to be translated in the X direction by the base 88. The wheel 82 is mechanically connected to the pipette 40, as by gear teeth on the wheel 82, or by means of a belt drive (not shown). The mechanical connection of the wheel 82 to the pipette 40 provides for a translation of the pipette 40 in the Z direction upon rotation of the wheel 82 by the motor 86. A belt drive 98 may be employed, similarly, for driving the table 68 in the Y direction in response to rotation of a motor 100 affixed to the rail 76.

As noted above in the description of the system of FIG. 1, the motor 28 is under control of the microprocessor 62. Similarly, motors 100, 90, and 86 are also under control of the microprocessor 62. Connections of the motors 28, 100, 90, and 86 are indicated in FIG. 2 by terminals A, B. C, and D, respectively. Thereby, movement of the pipette 40 can be synchronized with a positioning of the module 22 by the carousel 24 to a location directly beneath the beam 74. In order to provide access to the module 22 by the pipette 44, a slot 102 is provided in a top wall 104 of the temperature controlled chamber 36. The slot 102 is parallel to the beam 74. The location of the slot 102 relative to the beam 74 permits the stem 72 of the pipette 40 to be lowered through the slot 102 selectively above a desired compartment of a plurality of compartments 106 of a module 22. The length of the slot 102 is commensurate with the length of the module 22 to permit displacement of the stem 72 in the X direction for alignment with a selected one of the compartments 106. The slot 102 is relatively narrow, and has a width large enough to clear the stem 72 and the tip 70 mounted on the distal end of the stem 72. With respect to the overall dimension of the temperature controlled chamber 36, the area occupied by the slot 102 is sufficiently small to preclude any significant amount of air flow between the interior and the exterior of the chamber 36. Thereby, the slot 102 has no more than a negligible effect in the control of the chamber temperature, which temperature is controlled by the heater 38 (FIG. 1).

Fluid reagent is drawn into the pipette tip 70 and expelled from the tip 70 by vacuum pressure delivered to the pipette 40 by a suction unit which is of well-known form and is located within the pipette 40. The suction unit comprises a linear actuator 108 driven by a stepping motor (not shown) for driving a piston 110 via a rod 112. The piston 110 connects via a conduit 114 which passes through the stem 72 and into the tip 70. The microprocessor 62 commands the actuator 108 to apply vacuum for inducting fluid, and for releasing vacuum and applying positive pressure, if necessary, to expel the fluid reagent. Induction of fluid is done from a selected one of the reservoirs 66. Expelling of the fluid reagent is accomplished only when the tip 70 is in the position for dispensing the fluid to the selected one of the compartments 106 in the designated module 22. It is noted also that fluid reagent can be withdrawn also at one of the compartments 106 of the module 22 to be dispensed in another of the compartments 106. In this respect, a reservoir for storage of fluid reagent can be located directly within the module 22 or remote from the module 22, as at the table 68.

The locations of the various reservoirs 66 of the table 68 are stored in a memory of the microprocessor 62. This enables the microprocessor 62 to move the table 68 to a specific address in the Y direction, and to move the pipette 40 to a specific address in the X direction, the X and the Y components of the address fully identifying the requisite one of the reservoirs 66. In similar fashion, the microprocessor 62 stores locations of the available tips 70 held by the table 68 so that successive ones of the tips 70 can be selected for affixation to the stem 72.

The transport 64 is operative in the process of affixing a tip 70 to the stem 72 of a pipette 40, and in the detachment of the tip 70 from the stem 72. The procedure begins by a lifting of the pipette 40 so that the tip 70 clears the slot 102. The pipette 40 is then free to move along the beam 74 to an extractor 116. The extractor 116 has a semicircular channel 118 cut out in the edge of a horizontal portion of the extractor 116, the channel 118 having a diameter large enough to permit clearance of the stem 72 by the channel 118, but small enough to permit engagement of the channel 118 with the proximal end of the tip 70. Under commands of the microprocessor 62, the pipette 40 is brought towards the extractor 116 with the tip 70 being below the channel 118. The stem 72 enters the channel 118 after which the pipette 40 is raised to engage the tip 70 with the extractor 116. The tip 70 remains stationary as the stem 72 lifts out of the tip 70. Thereupon, the tip 70 falls into a bin 120 for collection of used tips 70. It is advisable to employ the extractor 116 at the beginning of operation of the test system 20 to ensure that the stem 72 is free for affixation of a new tip 70.

After ensuring that the stem 72 is free for reception of a tip 70, the pipette 40 is brought, by displacement in the X direction, to a location above the table 68, whereupon the table 68 is translated in the Y direction to bring the stem 72 above and in registration with a selected tip 70 held by the table 68. The pipette 40 then advances downward, along a central longitudinal axis of the pipette 40, to make contact with the interior surface of the tip 70. Thereupon, the pipette 40 is raised, and the tip 70 is retained on the distal end of the stem 72 by a feature of the invention described in the following.

In accordance with the invention, and with reference to FIGS. 2–8, the pipette 40 includes a novel pipette assembly 122 comprising the tip 70 and a tip holder 124. The tip 70 is formed as a hollow body comprising a crown 126 and a stem 128 which extends downwardly from the crown 126 in the normal vertical attitude of the pipette 40. The holder 124 is also formed as a hollow body and comprises a crown 130 and the aforementioned stem 72 which extends downwardly from the crown 130 in the normal vertical attitude of the pipette 40. Included within the tip crown 126 is a chamber 132 for receiving the holder stem 72. The chamber 132 forms a part of a passage 134 which extends from a proximal end 136 of the tip 70 to a distal port 138 at the far end of the tip stem 128. The tip passage 134 includes a relatively narrow bore 140 opening at the distal port 138, the opposite end of the bore 140 widening into a bowl 142 which communicates with the tip chamber 132. The tip bowl 142 has sufficient volume for storage of fluid drawn in through the tip bore 140 which fluid is to be expelled later via the tip bore 140.

Figure 6:
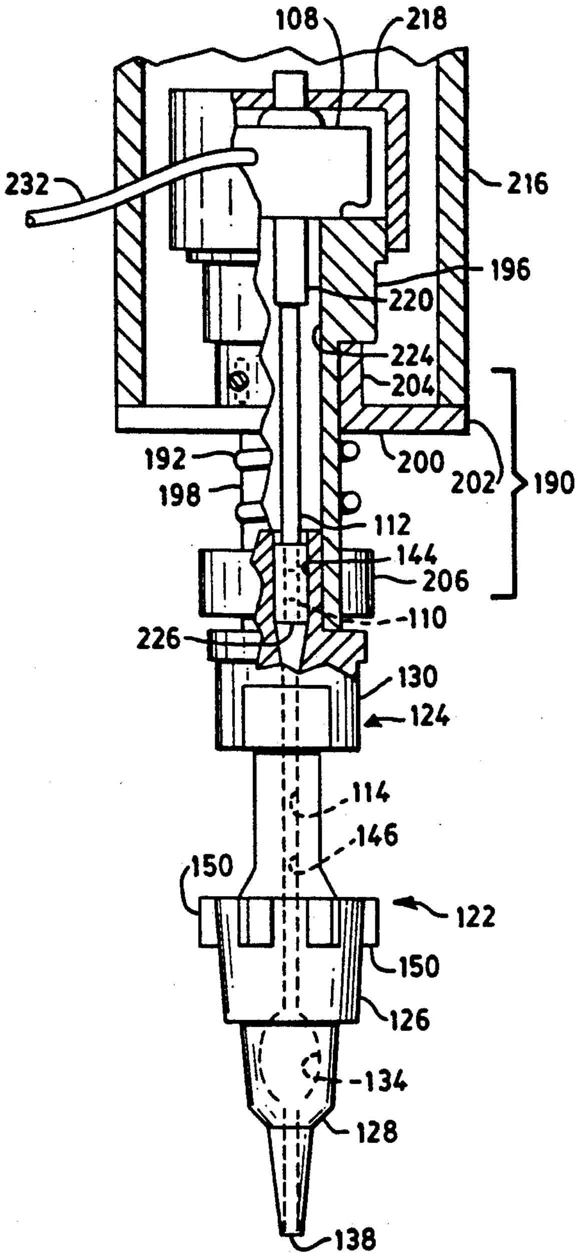
FIG. 6 is a side view of a pipette of FIG. 2, the view being partially sectioned adjacent a longitudinal central axis of the pipette.
Figure 7:
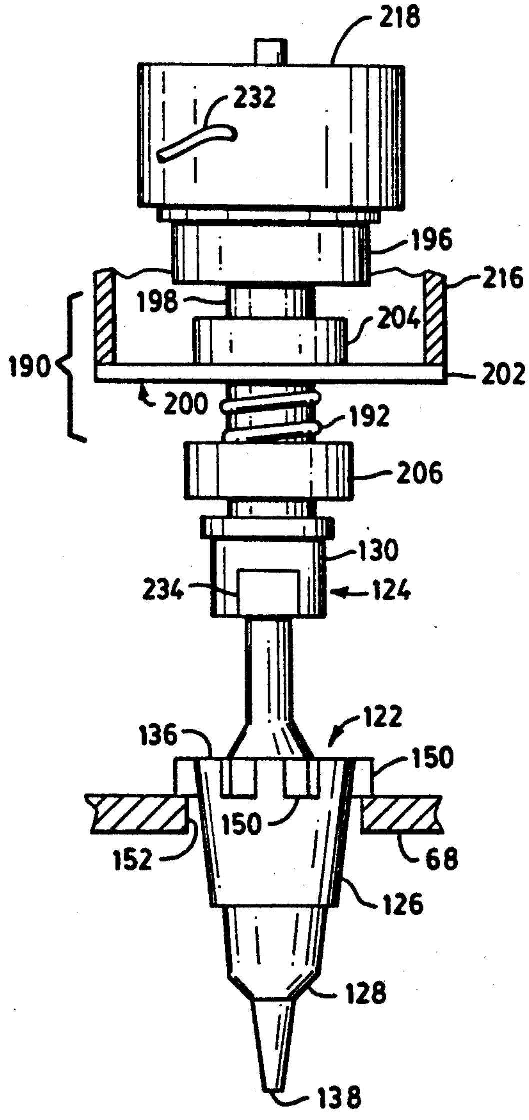
FIG. 7 is a side view of the pipette with the tip pressed against a tray which holds replacement tips (the tray being shown in FIG. 2), the view of FIG. 7 showing compression of a lost-motion connection between a tip holder and a vertical drive (the drive being shown in FIG. 2)

The holder 124 is also formed of a hollow body and includes a chamber 144 located in the holder crown 130, the holder 124 including a passage 146 which extends from the chamber 144 through the holder stem 72 to a distal port 148 at the end of the stem 72. Upon connection of the tip 72 with the holder 124, as depicted in FIGS. 2, 6 and 7, the holder passage 146 and the tip passage 134 together constitute the conduit 114 previously disclosed in FIG. 2. A set of fins 150 extend radially outward from the tip crown 126 for supporting the tip 70 in an aperture 152 of the table 68 (FIGS. 2 and 7).

Figure 5:
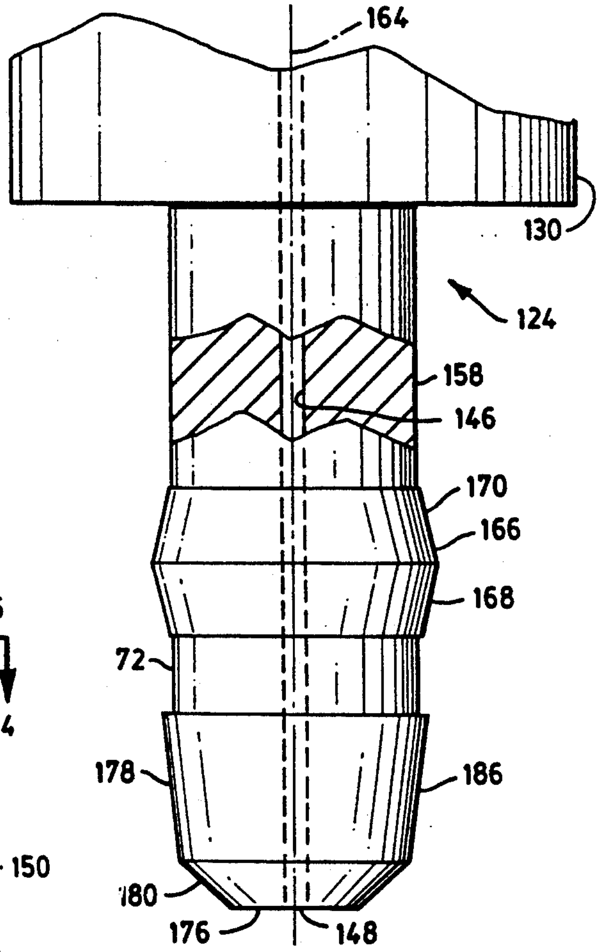
FIG. 5 is a side view of a stem of a pipette tip holder to be inserted into the tip of FIG. 3.

In accordance with a feature of the invention, the tip 70 is retained upon the holder stem 72 by a snap-lock retainer 154 (FIG. 3) formed along an interface between a sidewall 156 of the tip 70 and a sidewall 158 of the holder 124. The sidewall 156 encloses the tip chamber 132, and the sidewall 158 encloses the holder passage 146 (FIG. 5). One portion of the retainer 154 is formed as an assembly of ridges 160 formed of the inner surface of the tip sidewall 156 and extending inwardly towards a central longitudinal axis 162 of the tip 70. By way of example, three ridges 160 are provided, the ridges 160 being disposed symmetrically about the axis 162. The cross section of the tip sidewall 156 is circular. An inner edge of each ridge 160 is formed as a chord of the circular cross section of the Q tip sidewall 156. The holder stem 72 has a generally circular cylindrical shape about a longitudinal central axis 164 of the holder 124. A second part of the retainer 154 is formed as a protuberance 166 which extends from the outer surface of the holder sidewall 158 with circular symmetry about the holder axis 164.

Figure 3:
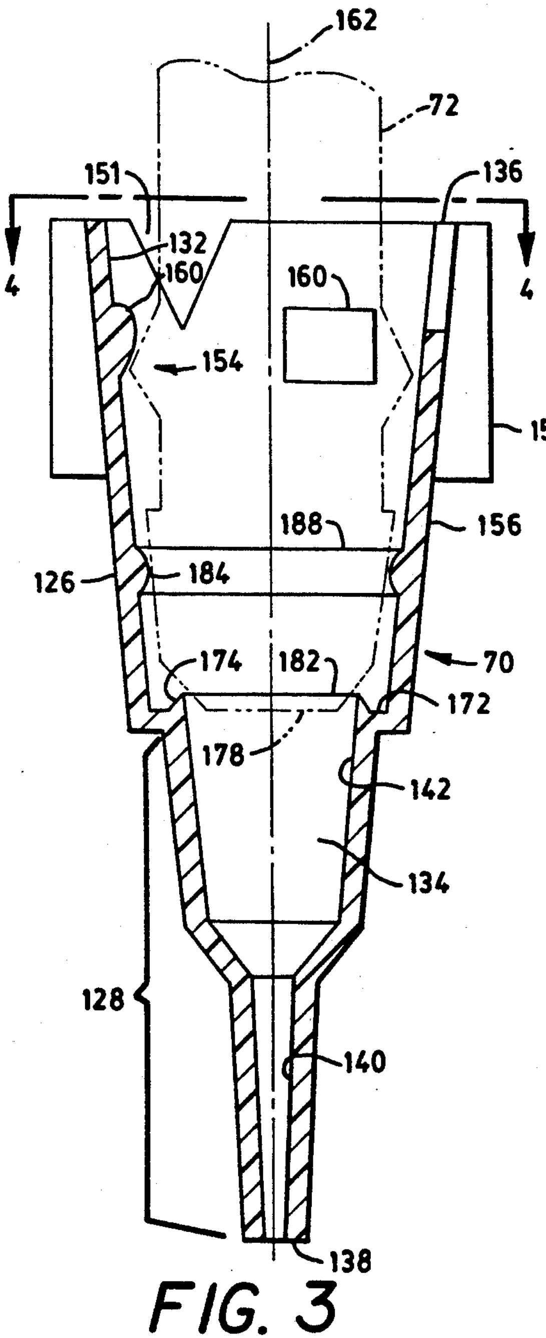
FIG. 3 is a longitudinal sectional view of a pipette tip employed in the system of FIG. 2 and incorporating features of the invention.

In the sectional view of the tip 70 of FIG. 3, there is superposed an outline in phantom view of the holder stem 72 to portray an interrelationship among surface features of the holder stem 72 and features of the inner surface of the tip sidewall 156. The tip sidewall 156 at the tip crown 126 is tapered with the cross section of the tip chamber 132 increasing in size with progression from the distal end of the chamber 132 towards the proximal end 136 of the tip 70. This facilitates manufacture of the tip 70 by a process of molding the tip 70 from a polymeric material. Preferably, the polymeric material should be relatively soft and resilient to permit elastic deformation of the tip 70 during insertion of the holder stem 72 into the tip chamber 132. Such elastic deformation is important for securing the snap-action of the retainer 154 and for construction of fluid seals as will be described hereinafter. With respect to the longitudinal sectional view of FIG. 3, a longitudinal ray of the sidewall 156 of the truncated conic surface of the tip chamber 132 is inclined relative to the tip axis 162. Similar inclination of a ray of the surface of the tip sidewall 156 is present in the extension of the sidewall 156 to the tip bowl 142 and to the tip bore 140 to provide taper of the tip stem 128 to facilitate manufacture by molding. The entire tip 70 is molded as an integral unit.

In the construction of the retainer 154, the protuberance 166 has a leading surface 168 and a trailing surface 170 which are inclined relative to the holder axis 164. This permits engagement of the protuberance 166 with the tip ridges 160, and distention of the ridges 160 away from the tip axis 162 during insertion of the holder stem 72 into the tip chamber 132 and during a retraction of the holder stem 72 from the tip chamber 132. Upon insertion of the holder stem 72 into the tip chamber 132, the tip axis 162 and the holder axis 164 coincide. As can be seen with reference to FIGS. 3 and 4, the minimum distance of each ridge 160 from the axis 162 is less than the maximum distance of the protuberance 166 from the axis Q 164. This produces a snap-action as each of the ridges 160 slide up the leading surface 168 and then begin to slide down the trailing surface 170 of the protuberance 166.

In the tip 70, at the distal end of the chamber 132, there is formed a ledge 172 in the tip sidewall 156, the ledge 172 extending in a plane transverse to the axis 162. At the inner edge of the ledge 172, there is formed a lip 174 which extends toward the proximal end 136 of the tip 70. The lip 174 engages with a surface 176 of a nose 178 of the holder stem 72. The nose surface 176 extends transversely away from the distal port 148 of the holder 124, and then extends further in an inclined fashion relative to the axis 164 as a skirt 180 of the nose 178. In a preferred embodiment of the invention, the inclination of a ray of the skirt 180 relative to the axis 164 is approximately 45 degrees. Upon insertion of the holder tip 72 into the tip chamber 132, the nose 178 advances to the ledge 172 with the skirt 180 abutting the lip 174 of the ledge 172. At the retainer 154, the inclination of the trailing surface 170 coacts with the ridges 160 to develop a force having a longitudinal component along the axis 162. The force of the retainer 154 urges the holder stem 72 towards the distal end of the tip 70, thereby driving the skirt 180 against the lip 174 with slight deformation of the lip 174. The deformation of the lip 174 conforms the lip 174 to the surface of the skirt 180 and provides a seal 182 which blocks all flow of air from the tip bowl 142 into the tip chamber 132.

The force along the axis 162 developed by the retainer 154 is provided by the resilience of the plastic material of the tip sidewall 156 which enables the tip sidewall 156 and the assembly of ridges 160 to act as a spring for securing the holder stem 72 within the tip chamber 132. During use of the extractor 116 (FIG. 2) for removal of a used tip 70 from the holder stem 72, the tip sidewall 156 and the assembly of ridges 160 readily deform to clear the protuberance 166, the force exerted by the extractor 116 upon the proximal end 136 of the tip 70 exceeding the snap-action force of the retainer 154 to allow extraction of the stem 72.

In a preferred embodiment of the invention, a second seal 184 is located along the interface between the holder sidewall 158 and the tip sidewall 156 in the chamber 132. The holder stem 72 is provided with an outwardly extending ring 186 which forms a part of the nose 178. An inwardly extending ring 188 is located on the inner surface of the tip sidewall 156 in the chamber 132, and is disposed with circular symmetry about the axis 162. The inwardly extending ring 188 is arranged between the first-mentioned seal 182 and the retainer 154. The; 15 outwardly extending ring 186 is tapered for increasing diameter with progression away from the distal port 148. The taper allows for engagement of the outwardly extending ring 188 with the inwardly extending ring 186 to form the seal 184 upon insertion of the holder stem 72 within the chamber 132. The ring 186 of the holder 124 extends for a greater distance along the holder axis 164 than the corresponding extent of the ring 188 of the tip 70 along the tip axis 162 to allow for sliding of the nose 178 past the tip ring 188. The resilience of the plastic material of the tip sidewall 156, which material is also employed in the construction of the ring 188, allows for elastic deformation of the ring 188 as is slides along the tapered surface of the ring 186 on the nose 178.

A feature of the invention is the establishment of a predetermined length to the pipette assembly 122 including the holder 124 in conjunction with any one of a number of replacement tips 70. Thus, when any previously used tip 70 is replaced with a new tip 70, the total length of the pipette assembly 122 has the desired predetermined length, which length is measured from the tip distal port 138 to a reference point in the holder 124, such as the distal end of the nose 178 or the distal edge of the crown 130. This predetermined length is maintained accurately among all of the tips 70 by the abutment of the skirt 180 of the nose 178 against the lip 174 of the ledge 172. The retainer 154, by urging the holder stem 72 against the ledge 172 ensures accurate mating of the skirt 180 with the lip 174 to maintain the desired predetermined length of the pipette assembly 122.

In the construction of the ridges 160, and in the construction of the inwardly extending ring 188 of the tip 70, the forward edges (the edges closest to the tip distal port 138) of the ridges 160 and the ring 188 are provided with a taper which facilitates the molding operation in the manufacture of the tip 70. The taper facilitates removal of the tip 70 from the part of the mold located within the tip 70 by allowing the ridges 160 and the ring 188 to slide over corresponding depressions in the mold. In the manufacturing process, testing of a completed tip 70 is provided by use of a circular pin-shaped gauge which is inserted into the tip 70 to contact the lip 174 to test the circumference thereof. Other circular gauges of differing diameters are employed similarly to check the circumferences of the tip ring 188 and the assembly of the ridges 166. A correct measure of circumference indicates proper performance of each of the seals 182 and 184 as well as of the snap-action of the ridges 160. Also, a correct circumference of the lip 174 indicates proper seating of the holder nose 178 against the tip lip 174 to ensure a correct distance between the holder distal port 148 and the tip distal port 138.

By way of example in the construction of a preferred embodiment of the tip 70, the following dimensions are employed. With respect to the construction of the tip stem 128, a longitudinal ray of the tip bore 140 is inclined at an an angle of 2 degrees with respect to the tip axis 162. The same angle of inclination is employed for longitudinal rays in the sidewall 156 of the tip bowl 142 and in a forward portion of the sidewall of the tip chamber 132. The forward portion of the sidewall of the tip chamber 132 extends approximately one-half of the axial length of the chamber 132. The sidewall 156 of the remaining half of the chamber 132 is tapered to a greater extent such that a ray of the sidewall is inclined at an angle of approximately 4 degrees. At the assembly of the ridges 166, the minimum diameter of a circular tangent to the inwardly extending edges of the ridges 160 is 0.270 inches with a tolerance of 0.002 inches. The angle of inclination of a ray of the sidewall 156 at the distal end of the tip bowl 142 is approximately 45 degrees. The inner diameter of the tip ring 188 of the second seal 184 is in the range of 0.243 inches to 0.246 inches. The diameter of the lip 174 of the ledge 172 is 0.187 inches with a . tolerance of 0.002 inches. The extent of the lip 174 along the tip axis 162 is 0.005 inches.

With respect to the tip holder 124, the ring 186 of the nose 178 has a maximum diameter of 0.248 inches and a minimum diameter of 0.238 inches both with a tolerance of 0.002 inches. The ring 186 of the nose 178 is tapered such that a longitudinal ray of the surface of the ring is inclined relative to the holder axis 164 at an angle of 3 degrees. In the construction of the protuberance 166 of the holder stem 72, the maximum diameter is 0.286 inches with a tolerance of 0.002 inches, and the minimum diameter at the distal and proximal ends of the protuberance 166 is 0.20 inches with a tolerance of 0.002 inches. The leading and the trailing surfaces 168 and 170 of the protuberance 166 are tapered such that a ray of the surfaces is inclined at an angle of 15 degrees relative to the holder axis 164.

Figure 4:
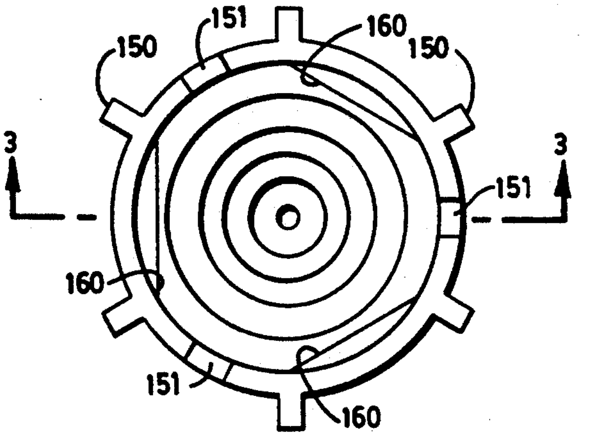
FIG. 4 is an end view of the pipette tip, taken along the line 4—4 in FIG. 3.

In a preferred embodiment the pipette tip has three notches spaced about 120° apart cut into the proximal end 136 of the tip 70. One such notch 151 is shown in FIG. 3 for purposes of illustration. The notches 151 are about 0.1 inch deep, about 0.1 inch across at the top and preferably form an included angle of about 25° with relation to axis 162. As illustrated in FIG. 4 the notches 151 are arranged such that the ridges 160 are not formed directly below them. The notches 151 allow the protruberance 166 to be extended outwardly farther from axis 164 (FIG. 5). The leading surface 168 of the protruberance 166 can be at a larger angle, for example, 30°, relative to axis 164 and the trailing surface 170 can remain the same, e.g., 15°. By including the notches 151 and providing the leading surface at the larger angle the force by which the pipette tip is retained can be advantageously increased.

The tip holder 124 is constructed of a metal, such as stainless steel, and is provided with a smooth surface to facilitate sliding into the tip chamber 132. The length of the pipette assembly 122 is selected in accordance with dimensions of the analytical instrument employed in the system 20 (FIGS. 1 and 2), including dimensions of the carousel 24, the module 22, and the chamber 36. By way of example in the selection of length, in a preferred embodiment of the invention, the length of the tip 70, as measured from the distal port 138 to the proximal edge of the lip 174, is in the range of 0.750 inch to 0.754 inch. In the holder stem 72, the distance from the distal port 148 to the center of the protuberance 166 (the outwardly extending peak) is 0.470 inches. With respect to the ridges 60, the maximum width of a ridge 160, as measured in a plane transverse to the tip axis 162, is approximately 0.015 inches. The interior diameter of the tip chamber 132 at the ledge 172 is 0.250 inch.

In accordance with a further feature of the invention, and as shown in FIGS. 2, 6, 7, and 8, the pipette 40 further comprises a spring-loaded lost-motion connection 190 which permits use of a stepping motor, the motor 86, for operating the vertical drive 78. As is well known, a stepping motor advances stepwise. Therefore, by use of a stepping motor in the vertical drive 78, the pipette 40 moves upward and downward in a sequence of incremental steps. The sequence of incremental steps is advantageous for control by the microprocessor 62 in that accurate control of the position of the pipette 40 can be attained by the microprocessor by the designation of a specific number of steps for advancement or retraction of the pipette 40. FIG. 6 shows the situation in which the pipette 40 can be advanced or retracted in the vertical direction freely. FIG. 7 shows the situation in which downward advancement of the pipette 40 is constrained by the table 68 which supplies the replacement tips 70 for the pipette 40. During the replacement of a pipette tip 70, upon the insertion of the holder stem 72 into the tip 70 to bring the holder nose 178 into abutment with the tip lip 174 (FIG. 3), the fins 150 are being pressed against the table 68 (FIG. 7). The pipette assembly 122 is restrained by the table 68 from further downward advancement even though the motor 86 may still be activated electrically for further advancement.

In view of the fact that, generally, the distance which the pipette 40 must travel in the vertical direction to reach the table 68 is a non-integral number of steps of the stepwise travel, provision must be made to absorb the additional movement of at least one fractional step. The lost-motion connection 190 provides this function so that even if the number of steps directed by the microprocessor 62 exceed the amount required to seat the nose 178 against the lip 174, the lost-motion connection 190 allows the pipette 40 to remain stationary while the vertical drive 78 continues to advance downwardly. The spring 192 in the connection 190 maintains downward force against the holder 124 during the additional advancement of the vertical drive 78, the force exerted by the spring 192 being sufficient to seat the nose 178 of the holder 124 against the lip 174 of the tip 70.

In addition to the spring 192, the lost-motion connection 190 further comprises a support body 194 having a crown 196 and a stem 198 extending downward from the crown 196, a slide 200 comprising a base 202 extending transversely of an axis of the pipette 40 and a collar 204 extending from the base 202 parallel to the pipette axis, and a nut 206 which is knurled to permit tightening by hand. The slide 200 slides along the stem 198, and includes a set screw 208 which mounts within the collar 204 and extends into a slot 210 in the stem 198 to allow translation of the slide 200 along the stem 198 while preventing rotation of the slide 200 about the stem 198. If desired, two "O" rings 212 may be positioned on opposite sides of the set screw 208 for encircling the stem 198 to maintain lubrication between the stem 198 and the slide 200. Apertures 214 in the base 202 allow connection of the slide 200 to an outer housing 216 of the vertical drive 78. Securing of the base 202 to the housing 216 may be accomplished by screws (not shown) passing through the apertures 214 into the housing 216.

The linear actuator 108, previously described with reference to FIG. 2, is located above the crown 196 and is enclosed within a cap 218 which is secured by threads to the crown 196. The motor of the actuator 108 operates a positioning element 220 by linear translation of the element 220 along the pipette axis. Also included within the pipette 40 is a piston assembly 222 which is supported within the chamber 144 of the holder 124, and extends upwardly through a central bore 224 of the support body 194 to connect with the positioning element 220. The piston assembly 222 is of well-known construction and is available commercially, the piston assembly 222 having the piston rod 112 which drives the piston 110, previously described with reference to FIG. 2. (The piston 110 is not shown in FIG. 8.) The piston 110 has the form of an insert of inert material, such as polytetrafluoroethylene (Teflon), within a nylon cylinder 226. The cylinder 226 is dimensioned to nest within the holder chamber 144 and serves as a liner between the holder 124 and the piston 110. The piston 110 is spring-loaded by a coil spring 228 disposed within a cylindrical shell 230 of the assembly 222 The positioning element 220 drives the piston rod 112 to advance the piston 110 in a downward direction towards the holder stem 72, and the spring 228 exerts a retractive force for retracting the piston away from the holder stem 72.

In operation, an electrical cable 232 connects the actuator 108 with the microprocessor 62, the cable passing through an aperture in the cap 218. The base 202, being fixed to the bottom of the housing 216 moves up and down with the vertical drive 78. In the event that the pipette 40 is free to move up and down, then the movement of the pipette 40 follows the movement of the slide 200 exactly. In the event that, during a downward motion of the vertical drive 78, the pipette 40 meets resistance of the table 68, then the slide 200 continues to advance further in the downward direction, and slides along the stem 198 of the support body 194. This sliding motion of the slide 200 constitutes a lost-motion connection of the slide 200 to the stem 198, and allows the vertical drive 78 to move stepwise further in the downward direction in response to the designated step count of the microprocessor 62. During the lost motion, the spring 192 is compressed so as to maintain a desired force of the holder 124 upon the tip 70 as the tip 70 is held by its fins 150 in the aperture 152 of the table 68.

Figure 8:
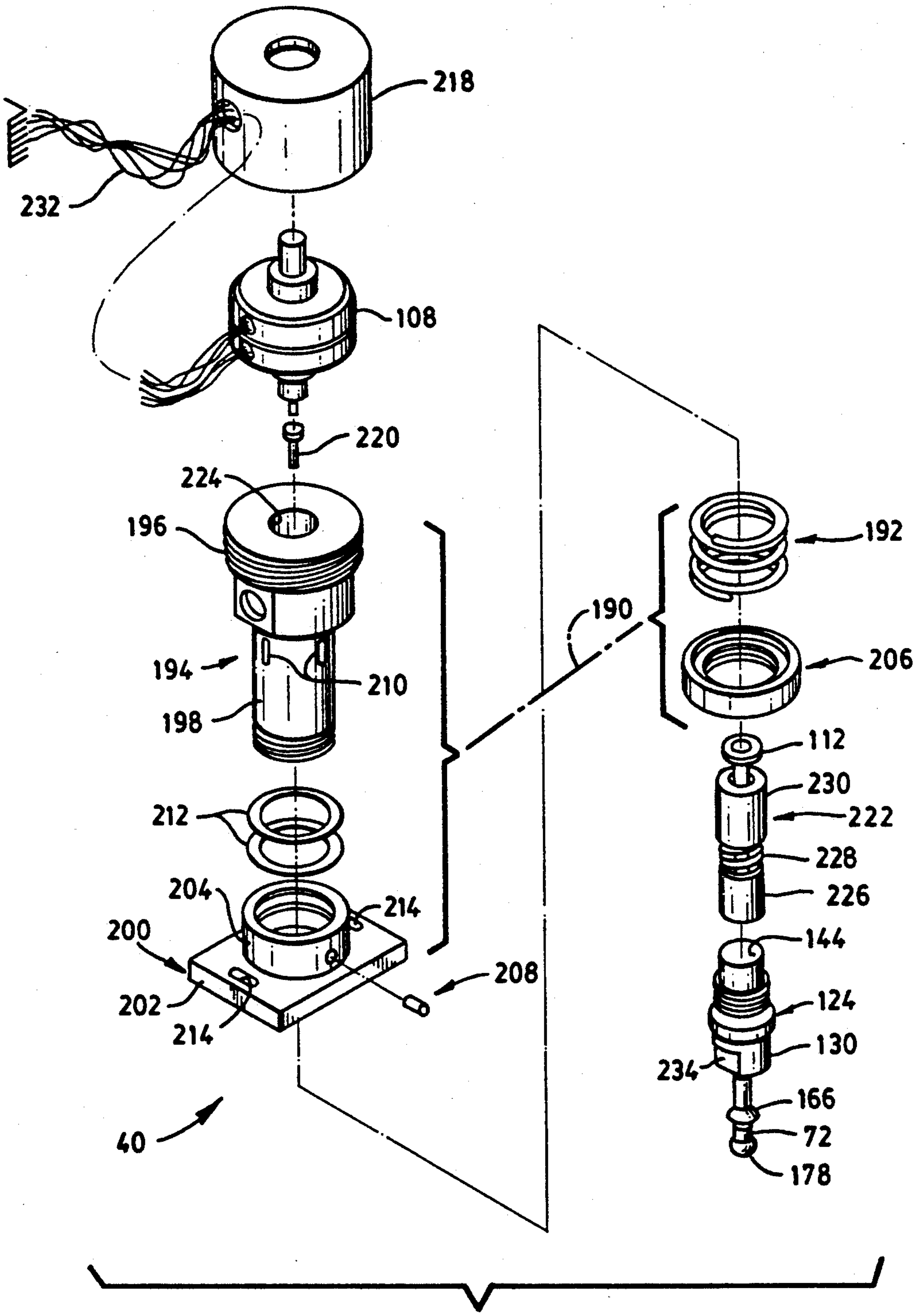
FIG. 8 is an exploded view of the pipette showing various components thereof, except for the pipette tip which has been deleted to simplify the drawing.

With respect to an assembly of the pipette 40, and with reference particularly to FIG. 8, the piston assembly 222 is inserted through the bore 224 of the support body 194 to be connected to the positioning element 220 of the actuator 108. The electrical cable 232 for the actuator 108 is pulled through the aperture in the cap 218, and the actuator 108 is placed within the cap 218, the latter being secured to the crown 196. The slide 200 is provided with the optional oil rings 212, and then is slid onto the stem 198 of the support body 194. The slide 200 is then oriented to place the set screw 208 in registration with a slot 210, whereupon the set screw 208 is rotated to advance the screw to the slot 210. The spring 192 is slid onto the stem 198 beneath the slide base 202 and is secured in its position on the stem 198 by the nut 206, the latter having an internal thread for mating with an external thread on the bottom end of the stem 198. The bottom portion of the piston assembly 222 is then placed in the chamber 144 of the tip holder 124, whereupon the holder 124 is secured to the bottom end of the stem 198 by external threads on the holder 124 which mate with internal threads on the body stem 198. A flat 234 on the holder crown 130 facilitates the gripping of the crown with a wrench for tightening the holder 124 into the stem 198.

Thereby, the system of the invention permits the pipette to transport fluid from a reservoir to a module compartment, and allows for the replacement of pipette tips between successive dispensing of the fluid. In addition, the pipette holder can engage with a replacement tip by a snap action by use of a vertical drive employing a stepping motor, this being accomplished by the use of a spring-loaded lost-motion connection.

Although the invention has been described in detail with respect to various preferred embodiments those skilled in the art will recognize that the invention is not limited thereto but rather that variations and modifications may be made which are within the spirit of the invention and the scope of the appended claims.

What is claimed is:

1. A pipette assembly comprising:

a pipette tip holder including a pipette tip holder crown and a pipette tip holder stem extending from said pipette tip holder crown;

a pipette tip including a pipette tip crown and a pipette tip stem extending from said pipette tip crown, there being a pipette tip chamber in said pipette tip crown and said pipette tip crown including a cylindrical sidewall with a circular cross section which surrounds said pipette tip chamber, the pipette tip holder stem being insertable into said pipette tip chamber;

wherein said pipette tip stem has a pipette tip stem passage extending along a central axis of said pipette tip from a distal port of said pipette stem tip to communicate with said pipette tip chamber at a distal end of said pipette tip chamber, there being a ledge at said distal end of said pipette tip chamber located at a predetermined distance from the distal port of said pipette tip stem, said ledge encircling a proximal end of said pipette tip stem passage, said ledge including an edge which contacts a surface of said pipette tip holder stem to form a seal upon insertion of said pipette tip holder stem into said pipette tip chamber; and said pipette tip holder stem has a passage extending along a central axis of said pipette tip holder stem to a distal port of said pipette tip holder stem to communicate with said pipette tip stem passage upon insertion of said pipette tip holder stem into said pipette tip chamber, said surface of said pipette tip stem which contacts said edge of said ledge being configured to mate with said ledge to position said holder distal port of said pipette tip holder stem at said predetermined distance from said distal port of said pipette tip stem; and means for retaining said pipette tip holder stem in said pipette tip chamber, said retaining means comprising a ridge element extending partway along an interior surface of said pipette tip chamber, wherein an edge of said ridge element is a chord of said cross sectional circle of said cylindrical sidewall of said pipette tip crown; and a ridge receiving member disposed on a sidewall of said pipette tip holder stem for receiving said ridge element said ridge receiving member having the form of a protruberance encircling said pipette tip holder stem, the protruberance having a surface inclined relative to a central axis of said pipette tip holder stem for contacting said ridge element to produce a snap action force upon travel of said ridge element past a peak of said protuberance during insertion of said pipette tip holder stem into said pipette tip chamber.

2. A pipette assembly according to claim 1 wherein said pipette tip holder stem comprises an outer ring extension having a taper which provides increased diameter with increasing distance toward the end of said pipette tip holder stem adjacent said pipette tip holder crown and said pipette tip crown comprises an inner ring extension which contacts the taper of said outer ring extension of said pipette tip holder stem upon insertion of said pipette tip holder stem into said pipette tip chamber, said pipette tip crown being constructed of a deformable material to provide a seal by contact of said inner and said outer ring extensions.

3. A pipette assembly according to claim 1 wherein said pipette tip chamber has three of said ridge elements extending partway along an interior surface of said pipette tip chamber, said ridge elements being positioned uniformly about said cross sectional circle.

4. A pipette system operative with a pipette for transferring fluid between a container and a compartment of an assay module in an assay system, the pipette system comprising a pipette including a pipette tip holder crown and a pipette tip holder stem extending from said pipette tip holder crown;

a tray carrying a plurality of pipette tips, each said pipette tip including a pipette tip crown and a pipette tip stem extending from said pipette tip crown, there being a pipette tip chamber in said pipette tip crown and said pipette tip crown including a cylindrical sidewall with a circular cross section which surrounds said pipette tip chamber, said plurality of pipette tips being oriented with their respective pipette tip chambers directed for receiving said pipette tip holder stem;

transport means for transporting said pipette between a container holding a fluid and a compartment of an assay module, said transport means serving to transport said pipette to said tray for replacement of a pipette tip and including a vertical drive for raising and lowering said pipette to enable transfer of fluid between a container holding fluid and a compartment of an assay module, wherein said pipette tip stem has a pipette tip stem passage extending along a central axis of said pipette tip from a distal port of said pipette stem tip to communicate with said pipette tip chamber at a distal end of said pipette tip chamber, there being a ledge at said distal end of said pipette tip chamber located at a predetermined distance from the distal port of said pipette tip stem, said ledge encircling a proximal end of said pipette tip stem passage, said ledge including an edge which contacts a surface of said pipette tip holder stem to form a seal upon insertion of said pipette tip holder stem into said pipette tip chamber; and said pipette tip holder stem has a passage extending along a central axis of said pipette tip holder stem to a distal port of said pipette tip holder stem to communicate with said pipette tip stem passage upon insertion of said pipette tip holder stem into said pipette tip chamber, said surface of said pipette tip stem which contacts said edge of said ledge being configured to mate with said ledge to position said holder distal port of said pipette tip holder stem at said predetermined distance from said distal port of said pipette tip stem; and means for retaining said pipette tip holder stem in said pipette tip chamber, said retaining means comprising a ridge element extending partway along an interior surface of said pipette tip chamber, wherein an edge of said ridge element is a chord of said cross sectional circle of said cylindrical sidewall of said pipette tip crown; and a ridge receiving member disposed on a sidewall of said pipette tip holder stem for receiving said ridge element said ridge receiving member having the form of a protruberance encircling said pipette tip holder stem, the protruberance having a surface inclined relative to a central axis of said pipette tip holder stem for contacting said ridge element to produce a snap action force upon travel of said ridge element past a peak of said protuberance during insertion of said pipette tip holder stem into said pipette tip chamber.

5. A pipette system according to claim 4 wherein each said pipette tip has a plurality of fin means extending outwardly from the pipette tip crown for contacting said tray to hold said pipette tip in position for engagement with said pipette tip holder.

6. A pipette system according to claim 5 wherein said pipette tip holder stem comprises an outer ring extension having a taper which provides increased diameter with increasing distance toward the end of said pipette tip holder stem adjacent said pipette tip holder crown and said pipette tip crown comprises an inner ring extension which contacts the taper of said outer ring extension of said pipette tip holder stem upon insertion of said pipette tip holder stem into said pipette tip chamber, said pipette tip crown being constructed of a deformable material to provide a second seal by contact of said inner ring extension with said outer ring extension, said taper facilitating engagement of said outer ring extension with said inner ring extension during insertion of said pipette tip holder stem into said pipette tip chamber.

7. A pipette system according to claim 6 further comprising means operative with said vertical drive for extracting a pipette tip from said pipette tip holder prior to affixation of a new tip during replacement of a pipette tip on said pipette.

8. A pipette system according to claim 7 further comprising spring means disposed between said vertical drive and said pipette tip holder for urging said pipette tip holder toward said tray upon transport of said pipette toward said tray by said transport means.

9. A pipette system according to claim 8 further comprising a lost motion connection disposed between said pipette and said vertical drive, said vertical drive including a stepping motor for displacing said pipette stepwise along a vertical path of travel toward said tray upon transport of said pipette toward said tray by said transport means, said lost-motion connection allowing a relative displacement between said tray and said vertical drive upon a contracting of said pipette tip holder with a pipette tip during replacement of a pipette tip.

10. A pipette system according to claim 4 further comprising means operative with said vertical drive for extracting a pipette tip from said pipette tip holder prior to affixation of a new pipette tip during replacement of a tip on said pipette.

11. A pipette system according to claim 10 further comprising spring means disposed between said vertical drive and said pipette tip holder for urging said pipette tip holder toward said tray upon transport of said pipette toward said tray by said transport means.

12. A pipette system according to claim 11 further comprising a lost motion connection disposed between said pipette and said vertical drive, said vertical drive including a stepping motor for displacing said pipette stepwise along a vertical path of travel toward said tray upon transport of said pipette toward said tray by said transport means, said lost-motion connection allowing a relative displacement between said tray and said vertical drive upon a contacting of said pipette tip holder with a pipette tip during replacement of a pipette tip.

* * * * *